United States Patent
Ress, Jr. et al.

(10) Patent No.: US 11,280,272 B1
(45) Date of Patent: Mar. 22, 2022

(54) AERO GAS TURBINE ENGINE WITH SPEED REDUCTION GEARBOX

(71) Applicant: Florida Turbine Technologies, Inc., Jupiter, FL (US)

(72) Inventors: Robert A Ress, Jr., Carmel, IN (US); Stephen M Brooks, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 304 days.

(21) Appl. No.: 16/537,587

(22) Filed: Aug. 11, 2019

(51) Int. Cl.
*F16H 57/02* (2012.01)
*F02C 7/36* (2006.01)
*F16H 57/00* (2012.01)
*B23F 1/02* (2006.01)
*B23K 31/02* (2006.01)
*B23K 101/00* (2006.01)

(52) U.S. Cl.
CPC ............... *F02C 7/36* (2013.01); *B23F 1/02* (2013.01); *B23K 31/02* (2013.01); *F16H 57/0025* (2013.01); *B23K 2101/001* (2018.08); *B23K 2101/008* (2018.08); *F05D 2230/232* (2013.01); *F05D 2260/4031* (2013.01)

(58) Field of Classification Search
CPC ............................................. B23K 2101/008
See application file for complete search history.

(56) References Cited

U.S. PATENT DOCUMENTS

| | | | |
|---|---|---|---|
| 2,109,155 A | 2/1938 | Sekella | |
| 2,457,942 A | 1/1949 | Van Zandt | |
| 2,567,482 A | 9/1951 | Hoffman et al. | |
| 2,668,454 A | 2/1954 | Schumb | |
| 2,857,777 A | 10/1958 | Porter | |
| 2,976,741 A | 3/1961 | Martin | |
| 3,033,597 A | 5/1962 | Miller | |
| 3,396,596 A | 8/1968 | Fischer | |
| 3,831,459 A * | 8/1974 | Satzler | B23K 20/129 74/439 |
| 4,270,410 A * | 6/1981 | Herscovici | F16H 1/20 74/433.5 |
| 4,938,089 A * | 7/1990 | Ohoka | B21K 1/30 192/108 |
| 5,363,714 A | 11/1994 | Hoguchi | |
| 5,483,847 A | 1/1996 | Reynolds | |
| 5,806,373 A | 9/1998 | Parker | |
| 6,155,136 A | 12/2000 | Telly et al. | |
| 6,170,156 B1 * | 1/2001 | Lev | B21D 53/28 29/404 |
| 6,553,868 B2 | 4/2003 | Takenaka et al. | |
| 8,108,996 B2 * | 2/2012 | Vogel | F16D 1/0858 29/888.1 |

(Continued)

*Primary Examiner* — Kayla Mccaffrey

(74) *Attorney, Agent, or Firm* — Katherine Koenig; Koenig IP Works, PLLC

(57) ABSTRACT

A lay shaft assembly for a speed reduction gearbox in a geared turbofan gas turbine engine, the lay shaft assembly having an output gear formed on a lay shaft as a single piece, and an input welded gear formed as a separate piece that is welded to the shaft in close proximity to the output gear. The output gear is machined and precision-ground prior to welding the input welded gear to the lay shaft so that the two gears can be located in close proximity. The input welded gear is precision-ground after the gear has been welded to the shaft.

2 Claims, 4 Drawing Sheets

(56) References Cited

U.S. PATENT DOCUMENTS

| | | | | |
|---|---|---|---|---|
| 8,887,488 B1* | 11/2014 | Paulino | ................ | F01D 13/003 60/263 |
| 2014/0162834 A1* | 6/2014 | Dogel | ................ | F16H 57/0025 475/338 |
| 2016/0146320 A1* | 5/2016 | Mordukhovich | ....... | F16H 3/097 475/207 |
| 2017/0343048 A1* | 11/2017 | Scheufler | ............ | F16H 57/0025 |
| 2018/0079291 A1* | 3/2018 | Phan | ..................... | B64D 27/02 |

* cited by examiner

AERO GAS TURBINE ENGINE WITH SPEED REDUCTION GEARBOX

CROSS-REFERENCE TO RELATED APPLICATIONS

None.

GOVERNMENT LICENSE RIGHTS

None.

BACKGROUND OF THE INVENTION

Field of the Invention

The present invention relates generally to a gas turbine engine, and more specifically to a turbofan gas turbine engine with a speed reduction gearbox.

Description of the Related Art Including Information Disclosed Under 37 CFR 1.97 and 1.98

A small gas turbine engine is used to power a small aircraft such as an unmanned aero vehicle. A small gas turbine engine operates at a relatively high rotational speed such as above 70,000 rpm. This high rotational speed is too high for driving a fan of the engine. Thus, a gearbox is required to decrease the speed of the shaft which drives the fan.

A typical speed reduction gear box for a geared turbofan engine has an input shaft with geared teeth that meshes with an output shaft also having geared teeth. For a relatively high rotation speed, such as that for a small gas turbine engine, the stress level at a root of the gear teeth is very high due to the high rotation speed of the gear. Thus, the prior art speed reduction gearbox is relatively heavy.

A power plant for an unmanned aerial vehicle (UAV) must be light weight and also be low in volume so that the aircraft can carry as much fuel as possible. When a compact design is desired in a gearbox, it becomes necessary utilize a planetary gear set that incorporates an intermediate lay shaft to achieve the required speed reduction. It is also necessary to put the gears on the lay shaft as close to one another as possible. The typical method to do this is to spline the shaft and stack the gears onto the shaft. On small gear sets, the added space required for splines and a locknut to hold the gear set stack tight results in a design that is not compact and thus adds weight and volume to the engine that results in less fuel capacity.

BRIEF SUMMARY OF THE INVENTION

A turbofan gas turbine engine with a speed reduction gearbox, where the gearbox is built up with a lay shaft without the need for splines and a locknut. High speed designs require that the final tool profile on the gear is achieved using precision grinding. Thus adequate space is necessary on either side of the gear during the grinding process to allow clearance for the grinding wheel.

The speed reduction gearbox is an apparatus and a process to form a single lay shaft with ground gears that start with two separate gear blanks. The gear teeth are rough-machined into each gear. The gears are then heat treated, and then the gear teeth on the output gear are precision-ground. Using a fixture, the other gear is then positioned on the lay shaft and welded. The welded gear teeth are then precision-ground relative to the teeth on the output gear thus resulting in fully precision-ground gears even though the clearance between the two gears is insufficient to allow grinding of the output gear after the assembly is welded. This process can be used on lay shafts containing more than two gears as well.

DETAILED DESCRIPTION OF THE INVENTION

The present invention is a geared turbofan gas turbine engine for a small aircraft such as a UAV in which a speed reduction gearbox is used to reduce the speed of the gas turbine output shaft. The gearbox incorporates an intermediate lay shaft gear set formed from two separate gears that are machined in the unassembled state where the welded gear is precision-ground after it has been welded to the output gear to form a compact gear assembly with the two gears as close together as possible.

Figure 1:
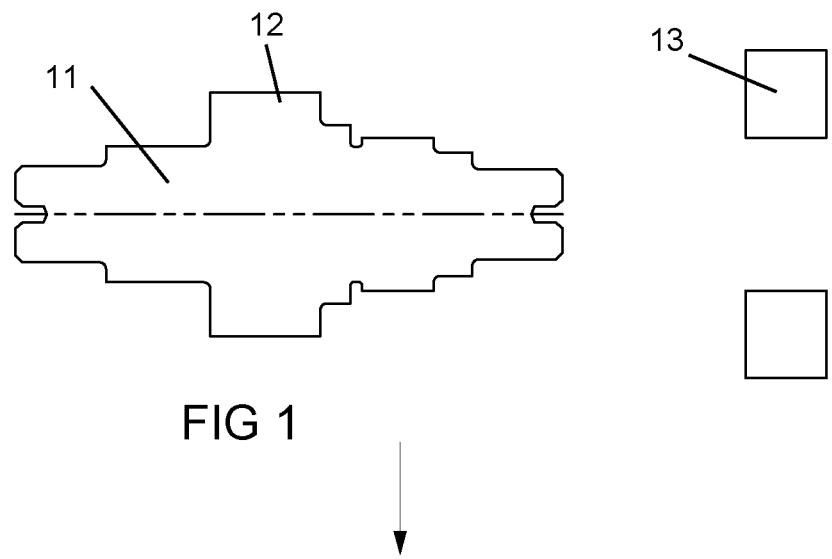
FIG. 1 shows the lay shaft and two separate gear blanks according to the present invention.

The process starts with two gear blanks that include the lay shaft 11 with an output gear blank 12 and a separate input welded gear blank 13. The output gear blank 12 is formed integral with the lay shaft 11 but could be formed as a separate piece that is then secured to the lay shaft 11. FIG. 1 shows the lay shaft 11 with the output gear blank 12 and the separate welded gear blank 13.

Figure 2:
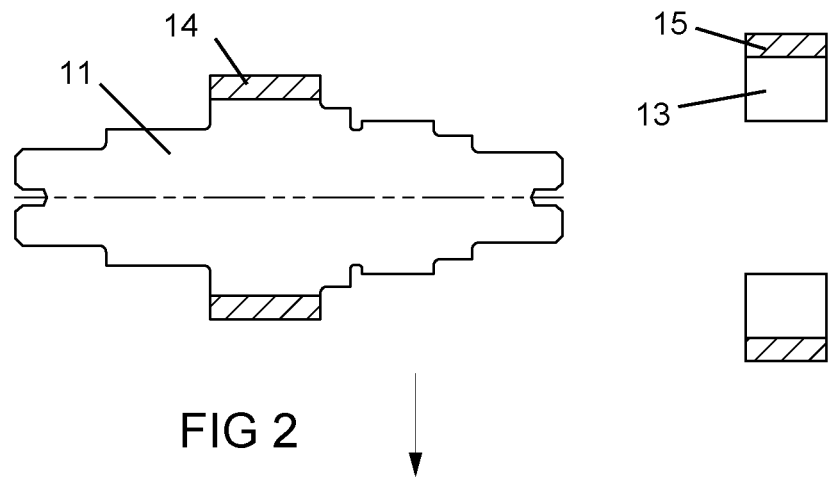
FIG. 2 shows the lay shaft with the two separate gears with machined teeth on both gears according to the present invention.

The gear teeth on both the output gear 12 and welded gear 13 are then machined with the two gears still separated as seen in FIG. 2 with the machined output gear teeth 14 and the machined input gear teeth 15. The machined output gear teeth 14 and the machined input gear teeth 15 are then both heat treated to a specified hardness of the gears.

Figure 3:
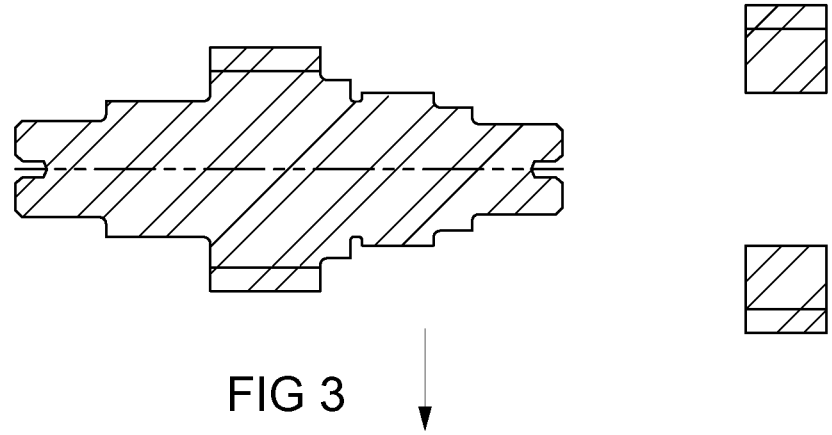
FIG. 3 shows the two separate gears after heat treatment.

FIG. 3 indicates the heat treatment step in which the lay shaft 11 and both gears 12 and 13 are heat treated.

Figure 4:
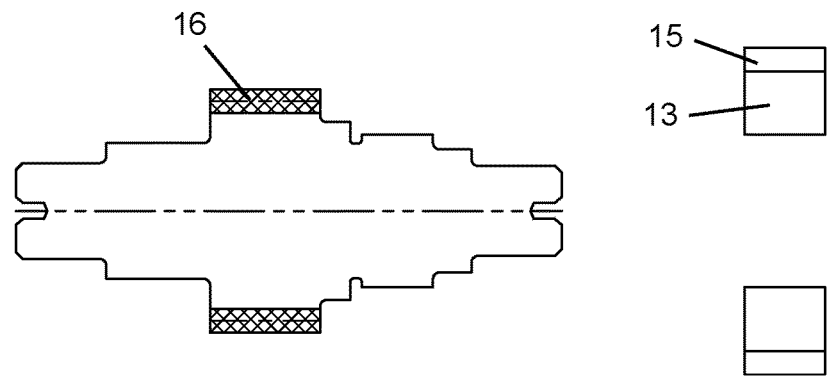
FIG. 4 shows the output gear with precision ground teeth according to the present invention.
Figure 5:
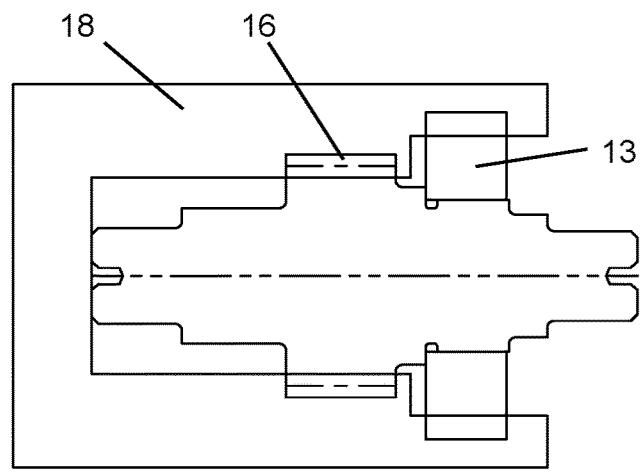
FIG. 5 shows the assembly in a fixture with the welded gear attached to the shaft.
Figure 6:
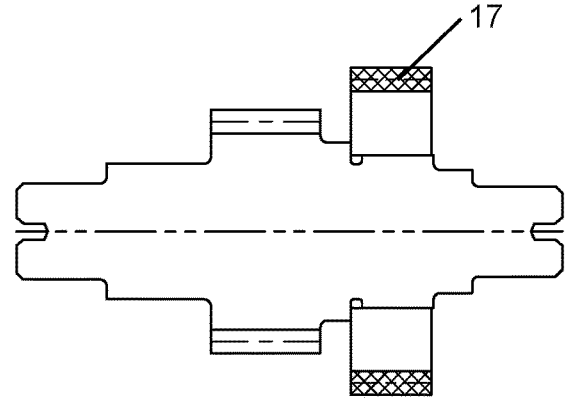
FIG. 6 shows the lay shaft with the welded gear having precision-ground teeth.

In the next step in FIG. 4, the machined teeth 14 of the output gear 12 are then precision-ground to form the output teeth 16. The welded or input gear 13 with the cut teeth 15 is then welded to the lay shaft 11 in close proximity to the precision-ground output gear 12 using fixturing 18 as seen in FIG. 5. The machined teeth 15 on the welded input gear 13 are then precision-ground to form the finished input welded gear teeth 17 as seen in FIG. 6. Thus, the smaller diameter output gear teeth 16 are both machined and precision-ground on the lay shaft 11 while the larger diameter input gear 13 is first machined with cut teeth 15 and then welded to the lay shaft 11 in close proximity to the output gear 12, and then precision-ground to form the finished gear teeth 17 while in place on the lay shaft 11. With this design, the intermediate lay shaft gear set for a speed reduction gear box is formed from two separate gears that are machined in the unassembled state where the welded gear teeth 17 are precision-ground after it has been welded to the lay shaft 11 to form a compact gear assembly with the two gears as close together as possible.

Figure 7:
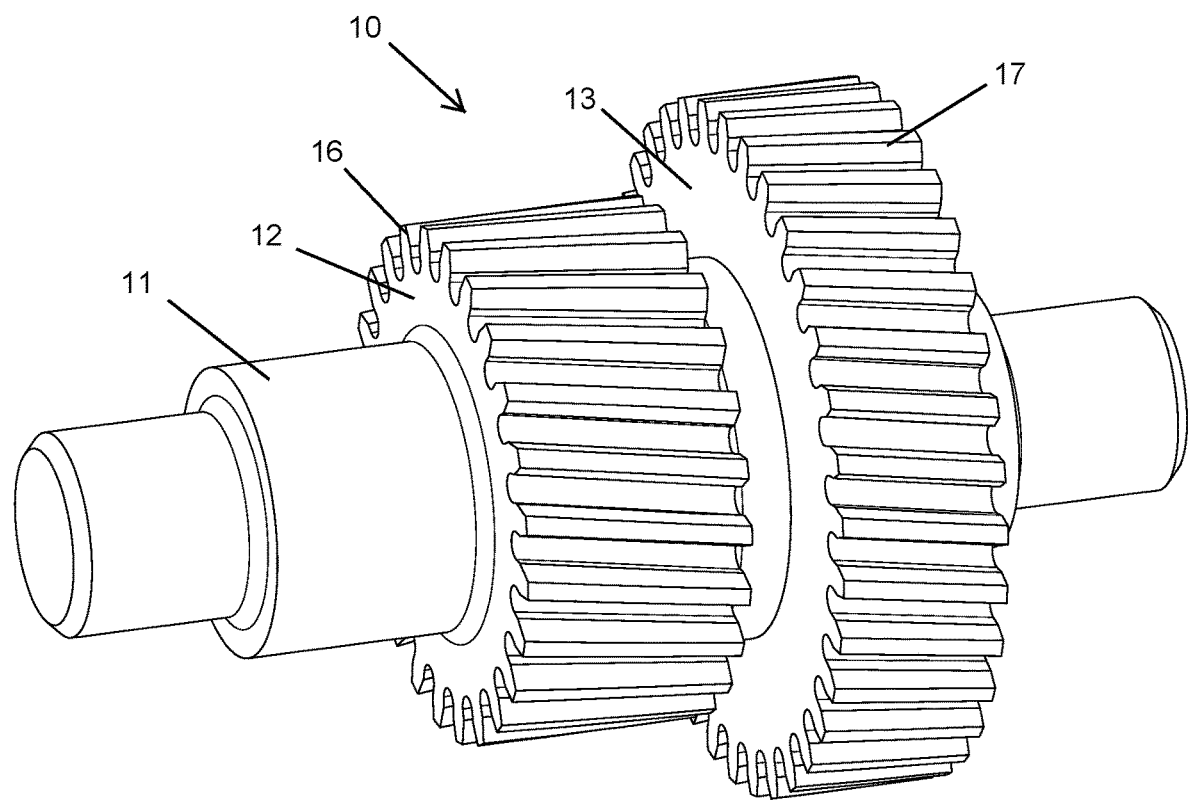
FIG. 7 shows an isometric view of the lay shaft gear set of the present invention.

FIG. 7 shows the finished lay shaft assembly 10 with the lay shaft 11, output gear 12 and the output gear teeth 16 and the input welded gear 12 with gear teeth 17. The lay shaft assembly 10 is used as a speed reduction gear set in a gearbox of a turbofan gas turbine engine to reduce the rotational speed from the engine to the fan.

Figure 8:
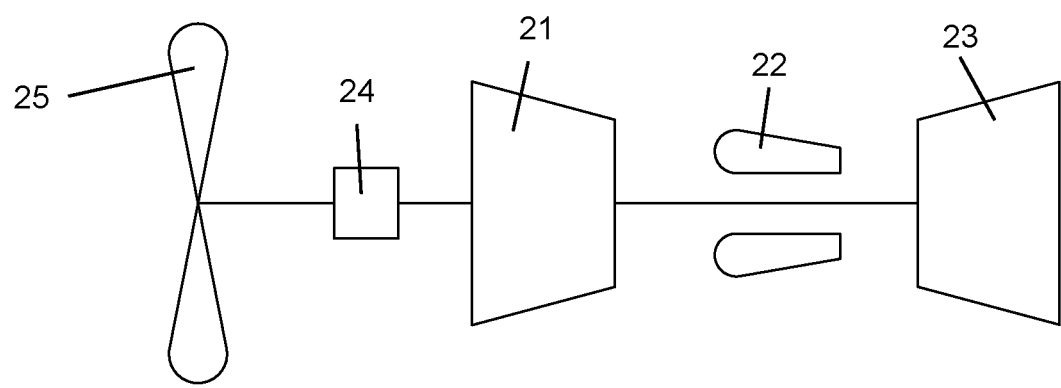
FIG. 8 shows a schematic view of a geared turbofan engine with the lay shaft gear set of the present invention.

FIG. 8 shows a diagram of a turbofan engine with a compressor 21 driven by a turbine 23 with a combustor 22 that produces a hot gas flow that passes through the turbine to drive both the compressor 21 and a fan 25 of the engine. A speed reduction gearbox 24 is positioned between the engine and the fan to reduce the rotation speed of the engine to the fan 25.

The invention claimed is:

1. A process for forming a lay shaft of a speed reduction gearbox comprising the steps of:

forming an output gear with an output gear blank as a single piece;

machining teeth in the output gear blank;

machining teeth on an input welded gear blank where the input welded gear blank has a greater diameter than the output gear blank;

heat treating the output gear with the machined teeth and the input welded gear with the machined teeth;

precision-grinding the teeth on the output gear;

welding the input welded gear with the machined teeth to the lay shaft in close proximity to the output gear such that the machined teeth on the output gear could not be ground with the input welded gear welded on the lay shaft; and, precision-grinding the machined teeth on the input welded gear.

2. A lay shaft assembly for a speed reduction gearbox comprising:

a lay shaft with an input welded gear and an output gear;

the input welded gear has a greater diameter than the output gear;

the input welded gear is in close proximity to the output gear; and, the lay shaft assembly is formed according to claim 1.

\* \* \* \* \*